United States Patent Office.

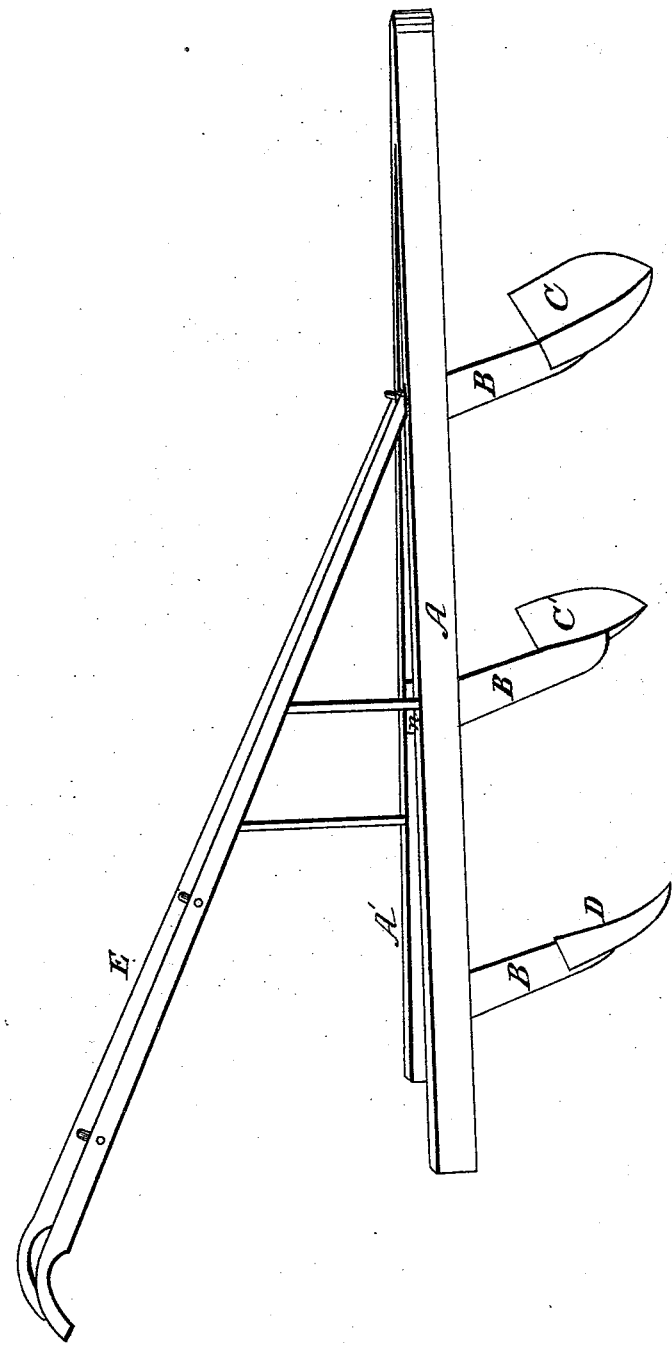

WILLIAM N. RHINEHART AND HENRY FELKER, OF MIAMI CITY, OHIO, ASSIGNORS TO THEMSELVES AND O. P. RUSSELL.

Letters Patent No. 61,760, dated February 5, 1867.

IMPROVEMENT IN CORN CULTIVATOR.

The Schedule referred to in these Letters Patent and making part of the same.

TO ALL WHOM IT MAY CONCERN:

Be it known that we, WILLIAM N. RHINEHART and HENRY FELKER, of Miami City, in the county of Montgomery, in the State of Ohio, have invented a new and improved Corn Cultivator; and we do hereby declare that the following is a full and exact description thereof, reference being had to the accompanying drawings, and to the letters of reference marked thereon.

The nature of our invention consists in arranging within a frame a peculiar form of shovel, with which to stir the soil near the roots of the growing corn, remove the clods, and carry the pulverized earth to the hill.

To enable others skilled in the art to make and use our invention, we will proceed to describe its construction and operation.

The figure represents a perspective view of the corn cultivator.

A' represents one part of the frame; and to this part is attached, at the front end, the part A, which is set at a sufficient angle to give the requisite width at the base, the two parts being connected at the rear by the cross-piece n. To this frame are attached the usual handles E to guide the cultivator. The three posts B are attached to the under side of the frame, and have an inclination forward. To the front post, attached to part of frame A', is bolted the shovel C. To the middle post, which is attached to the cross-piece n, is bolted the shovel C'; and to the rear post, which is attached to part of frame A, is bolted a shovel plough, of the usual form, which ploughs the centre between the rows of corn. The plough C is constructed with one part identical with one-half of the usual form of shovel plough, and from the divided side is a projection, as shown in the drawing, set at right angle with the other part. The plough C' is identical with that of C, with the exception that it is constructed in a reversed order.

The operation is described thus: The corn row being to the left hand, the forward plough, presenting a vertical line next to the corn, can be brought nearer to the corn than by a curved shovel, and likewise deeper, the projecting part serving to catch the clods, which are thrown to the right side, the plough C' being set behind, and a little to the right of the front one, the projection of which stays the clods from falling towards the corn row, whilst the other part carries the pulverized soil to the corn, which had been loosened and raised up by the preceding plough; the plough D serving to stir the soil at the centres of the rows.

What we claim as our invention, and desire to secure by Letters Patent, is—

The ploughs C C', when constructed substantially as described, and their arrangement, with reference to the plough D and frame, in the manner and for the purpose specified.

WILLIAM N. RHINEHART,
HENRY FELKER.

Witnesses:
LEVI WENGER,
THOS. D. MITCHELL.